United States Patent
Io et al.

(10) Patent No.: US 6,823,420 B2
(45) Date of Patent: Nov. 23, 2004

(54) ENTERTAINMENT APPARATUS

(75) Inventors: Hideaki Io, Yokohama (JP); Yasuyuki Yamamoto, Kawasaki (JP); Yuichi Inomata, Tokyo (JP); Shinichi Fukushima, Machida (JP); Shigekazu Hayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 404 days.

(21) Appl. No.: 09/798,695

(22) Filed: Mar. 2, 2001

(65) Prior Publication Data

US 2002/0046306 A1 Apr. 18, 2002

(30) Foreign Application Priority Data

Mar. 3, 2000 (JP) ........................................ 2000-059348

(51) Int. Cl.[7] .......................... G06F 13/36; G06F 13/28
(52) U.S. Cl. ........................ 710/307; 710/306; 710/22; 710/23
(58) Field of Search ................................ 710/307, 306, 710/22, 23

(56) References Cited

U.S. PATENT DOCUMENTS

| | | | |
|---|---|---|---|
| 4,514,808 A | | 4/1985 | Murayama et al. |
| 5,548,786 A | * | 8/1996 | Amini et al. .................. 710/22 |
| 5,812,798 A | * | 9/1998 | Moyer et al. ................ 710/307 |
| 5,918,028 A | * | 6/1999 | Silverthorn et al. ......... 710/306 |
| 5,944,800 A | * | 8/1999 | Mattheis et al. ............... 710/23 |
| 6,047,347 A | * | 4/2000 | Hansen et al. .............. 710/307 |
| 6,563,739 B2 | * | 5/2003 | Aho et al. ............. 365/185.23 |

OTHER PUBLICATIONS

Japanese Office Action Dated Nov. 4, 2003.

* cited by examiner

*Primary Examiner*—Tim Vo
(74) *Attorney, Agent, or Firm*—Katten Muchin Zavis Rosenman

(57) ABSTRACT

An entertainment apparatus comprising a peripheral device and a controller for controlling the peripheral device. The peripheral device and the controller are connected each other by an address bus and a data bus. The peripheral device which receives a DMA acknowledge signal from the controller carries out 32-bit DMA transfer using lower 16 bits of the address bus and the data bus, during assertion of the DMA acknowledge signal.

10 Claims, 2 Drawing Sheets

ENTERTAINMENT APPARATUS

This application claims a priority based on Japanese Patent Application No. 2000-59348 filed on Mar. 3, 2000, the entire contents of which are incorporated herein by reference for all purposes.

BACKGROUND OF THE INVENTION

1. Field of the Invention

The present invention relates to an entertainment apparatus for carrying out video games and the like, particularly, to a method for controlling a bus inside the entertainment apparatus.

2. Description of the Related Art

Conventionally, an entertainment apparatus for carrying out video games and the like has been known. Some of peripheral devices such as a DVD, used for recent entertainment apparatuses require a higher transfer rate. In order to employ such device, the transfer rate should be increased between, for example, a CPU and the peripheral device.

The width of the data bus could be widened to raise the transfer rate, but simple widening of the width of the data bus necessitates increase of the number of pins of a package of a CPU and the like, thus results in increase of the cost. Another idea to reduce the number of pins is the multiplexed bus like PCT. However, most of conventional peripheral devices require independent address and data lines

SUMMARY OF THE INVENTION

An object of the present invention is to increase the transfer rate without increasing the number of pins of a package of a device such as a CPU.

An entertainment apparatus according to the present invention comprises a peripheral device and a controller for controlling the peripheral device (for example, a CPU or an input/output sub-processor). In such entertainment apparatus, the peripheral device and the controller are connected each other by an address bus and a data, and at least a part of the address bus is used as the data bus in a specific data transfer.

In the entertainment apparatus, the specific data transfer may be performed, for example, during the assertion of the DMA(Direct Memory Access) acknowledge signal.

Further, the peripheral device may be a PC card interface portion, and in accordance with a type of a PC card connected thereto, it is determined whether at least a part of the address bus is used as the data bus.

DETAILED DESCRIPTION OF THE PREFERRED EMBODIMENT

An embodiment according to the present invention is described in detail hereinafter, referring to drawings.

Figure 1:
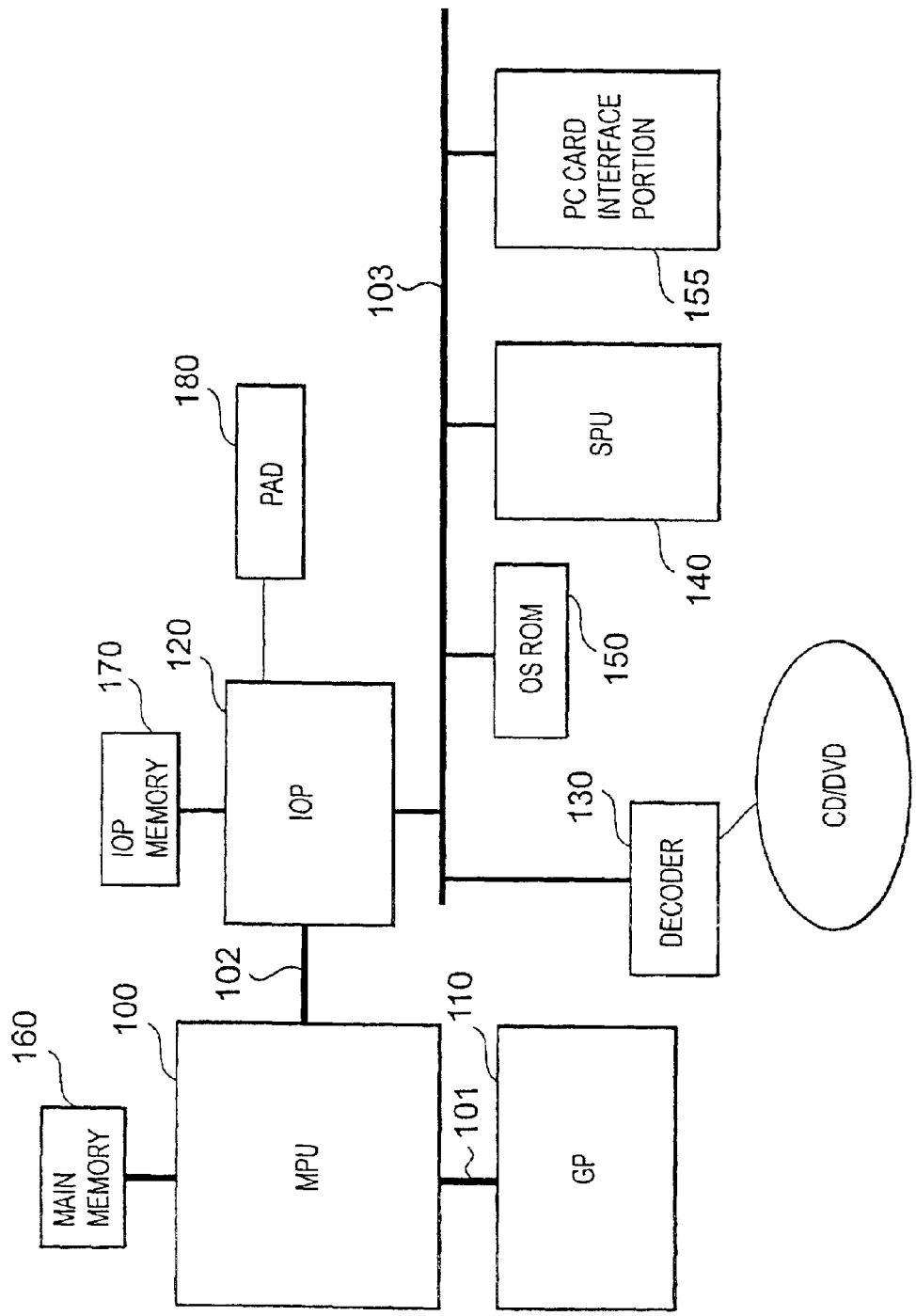
FIG. 1 shows a configuration of an entertainment apparatus according to the present invention.

FIG. 1 shows a configuration of an entertainment apparatus to which the present invention is applied.

As shown in FIG. 1, the entertainment apparatus according to the present invention comprises a MPU 100, a GP 110, an IOP 120, a CD/DVD decoder 130, an SPU 140, an OSROM 150, a PC card interface portion 155, a main memory 160 and an IOP memory 170.

The MPU 100 and the GP 110 are connected each other by a dedicated bus 101. The MPU 100 is also connected with the IOP 120 by means of a bus 102, which is called SBUS. The IOP 120, the CD/DVD decoder 130, the SPU 140, the OSROM 150 and the PC card interface portion 155 are connected to a bus 103 called SSBUS.

The MPU 100 is also connected with the main memory 160, and the IPO 120 is connected with the IOP memory 170. Furthermore, the IPO 120 is connected with a controller (PAD) 180.

The MPU 100 is a main CPU (Central Processing Unit) of this entertainment apparatus. The MPU 100 carries out programs stored in OSROM 150 and programs loaded from a CD or a DVD into the main memory 160 thereby to perform a predetermined process.

The GP 110 is a graphic processor responsible for a rendering function in this entertainment apparatus. The GP 110 performs drawing process according to instructions issued from the MPU 100.

The IOP 120 is an input/output sub-processor, which controls data exchange between the MPU 100 and the peripheral devices (such as the CD/DVD decoder 130 and the PC card interface portion 155).

The CD/DVD decoder 130 reads data from the CD or the DVD to transfer the data to the main memory 160.

The SPU 140 is a sound reproducing processor for reproducing compressed waveform data, stored in a sound buffer (not shown), at a predetermined sampling frequency on the basis of a sound-producing command from the MPU 100 or the like.

The OSROM 150 is a ROM (Read Only Memory) storing programs executable by the MPU 100 and by the IOP 120, for example, at a time of starting up.

The PC card interface portion 155 provides an interface for accessing, such as reading and writing, to a PC card (not shown) having been loaded into a PC card slot provided in this entertainment apparatus.

The main memory 160 is a main memory of the MPU 100, and stores commands executed by the MPU 100 and data used by the MPU 100.

The IOP memory 170 is a main memory of the IOP 120, and stores commands executed by the IOP 120 and data used by the IOP 120.

The controller (PAD) 180 is an interface for transmitting a player's intention to an application while carrying out a game or the like.

In this embodiment, the present invention is applied to the SSBUS 103 connecting the IOP 120 with the peripheral device in the entertainment apparatus having the above configuration.

Figure 2:
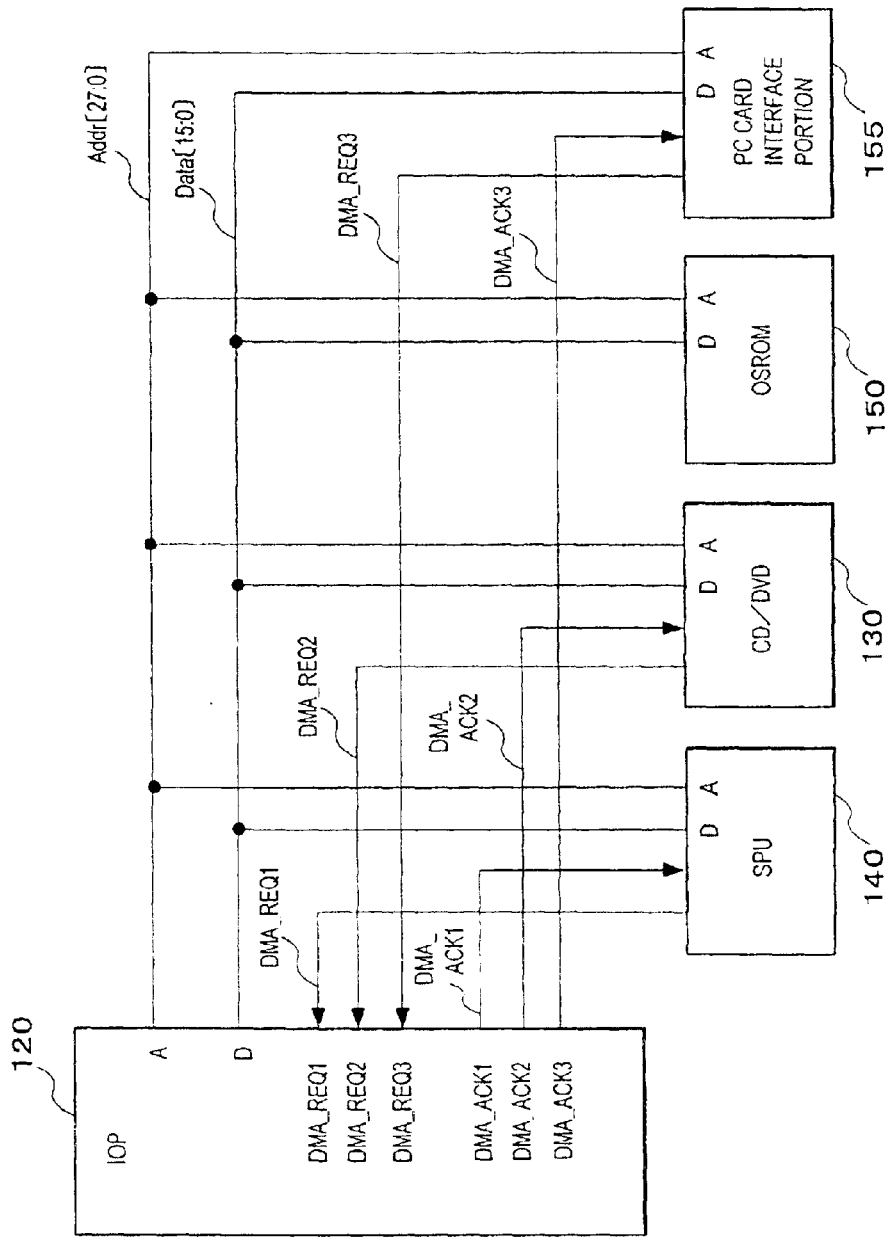
FIG. 2 shows connection between an IOP 120 and peripheral devices.

FIG. 2 shows how to connection between the IOP 120 and peripheral devices in detail.

As shown in FIG. 2, the IOP 120, the CD/DVD decoder 130, the SPU 140, the OSROM 150 and the PC card interface portion 155 are connected one another by an address bus Addr[27:0] and a data bus Data[15:0].

The IOP 120 and the SPU 140 are connected each other by a DMA request signal DMA_REQ1 and a DMA acknowledge signal DMA_ACK1. Similarly, the IOP 120 and the CD/DVD decoder 130 are connected by a DMA request signal DMA_REQ2 and a DMA acknowledge signal DMA_ACK2, while the IOP 120 and the PC card interface portion 155 are connected by a DMA request signal DMA_REQ3 and a DMA acknowledge signal DMA_ACK3.

The IOP 120 and the peripheral devices are also connected by other signals, such as chip selection signal, read signal and write signal.

The SPU 140 supports only 16 bit DMA transfer. When the SPU 140 requests DMA transfer, it asserts the DMA request signal DMA_REQ1 to the IOP 120. In response to the assertion of the DMA_REQ1, the IOP 120 asserts the DMA acknowledge signal DMA_ACK1 when it allows the DMA transfer.

The SPU 140, which has received the DMA acknowledge signal DMA_ACK1 from the IOP 120, performs DMA transfer using the data bus Data[15:0]. In this case, the maximum transfer rate is, for example, 75 MB/s when the operating frequency of the IOP 120 is 37.5 MHz.

The CD/DVD decoder 130 and the PC card interface portion 155 support 32-bit DMA transfer. They may be implemented to support only the 32-bit DMA transfer or to alternatively use the 16-bit or the 32-bit DMA transfer by switching. In this case, it is required for the IOP 120 to know which DMA transfer each peripheral device performs.

The switching between the 16-bit and 32-bit DMA transfer can be performed based on, for example, an operation mode of the entertainment apparatus. For example, the IOP 120 may recognize that, in a normal operation mode, the CD/DVD decoder 130 performs the 32-bit DMA transfer, and that, in a lower compatible operation mode, the decoder performs the 16-bit DMA transfer.

The switching may be performed according to a type of the loaded PC card. In this case, data indicating whether or not the 32-bit DMA transfer is supported, is stored in a control register in the PC card, for example. The IOP 120 refers to the data, for example, at a time of loading the PC card, thereby to determine whether or not the currently loaded PC card supports the 32-bit DMA transfer. The IOP 120 considers the PC card interface portion 155 to perform the 32-bit DMA transfer, when it determines that the currently loaded PC card supports the 32-bit DMA transfer.

The 16-bit DMA transfer by the CD/DVD decoder 130 is performed in the same way as the above-mentioned SPU 140. The case of 32 bits of DMA transfer is described hereinafter. The PC card interface portion 155 also performs the DMA transfer in the same way.

In the DMA transfer, the address bus Addr[27:0] is not used since the DMA transfer is performed as an access to a specific port of the CD/DVD decoder 130. Therefore, lower 16 bits Addr[15:0] among the address bus Addr[27:0] is used for transferring data to achieve the 32-bit DMA transfer.

The DMA request signal DMA_REQ2 is asserted to the IOP 120 when the CD/DVD decoder 130 requests the DMA transfer. In response to the assertion of the DMA_ACK2, when the IOP 120 allows the DMA transfer, it asserts the DMA acknowledge signal DMA_ACK2.

The CD/DVD decoder 130, which has received the DMA acknowledge signal DMA_ACK2 from the IOP 120, uses the lower 16 bits Addr[15:0] of the address bus as the data bus Data[31:16] during the assertion of the DMA acknowledge signal DMA_ACK2.

Thus, the width of the data bus, together with the data bus Data[15:0], can be 32 bits between the IOP 120 and the CD/DVD decoder 130 in the DMA transfer. Accordingly, the maximum transfer rate can be made twice as much (for example, 150 MB/s).

In addition, there is no need to increase the number of pins of a package of the IOP 120 since the existing address signals are used.

In this embodiment, the lower 16 bits Addr[15:0] of the address bus are used as the data bus Data[31:16] only in specific DMA transfer. Therefore, normal 16-bit DMA and normal I/O access which uses the address bus Addr[27:0] can exit together in the SSBUS 103.

It is of course possible to use all of the address bus for data transfer, although a part of the address bus (the lower 16 bits) is used for data transfer in the embodiment described above.

Thus, as described above, in the entertainment apparatus according to the present invention, it is possible to widen the width of the bus in DMA transfer without increasing the number of pins of a package of a device such as a CPU.

The entire disclosure of Japanese Patent Application No. 2000-59348 filed on Mar. 3, 2000 including specification, claims, drawings, and summary is incorporated herein by reference in its entirety.

What is claimed is:

1. An entertainment apparatus comprising a peripheral device and a controller for controlling the peripheral device,
   wherein the peripheral device and the controller are connected by an address bus and a data bus, and
   wherein at least part of the address bus is used as the data bus in a specifc data transfer which is performed while an acknowledge signal of direct memory access (DMA) transfer is asserted.

2. An entertainment apparatus according to claim 1, wherein the peripheral device is a personal computer (PC) card interface portion,
   wherein, in accordance with a type of a PC card connected thereto, it is determined whether at least a part of the address bus is used as the data bus.

3. An entertainment apparatus according to claim 1, wherein the peripheral device is a compact disc/digital versatile disc (CD/DVD) decoder.

4. An entertainment apparatus according to claim 1, wherein the controller is an input/output (I/O) processor.

5. An entertainment apparatus comprising:
   a first peripheral device supports direct memory access (DMA) transfer having first data width;
   a second peripheral device supports DMA transfer having a second data width wider than the first data width; and
   a controller for controlling the first and second peripheral devices,
   wherein the first and second peripheral devices and the controller are connected by an essential set of an address bus and a data bus,
   wherein the data bus has the first data width, and
   wherein the second peripheral device uses at least a part of the address bus as the data bus in DMA transfer.

6. An entertainment apparatus according to claim 5, wherein the second peripheral device uses at least a part of the address bus as the data bus while the controller asserts an acknowledge signal of DMA transfer.

7. An entertainment apparatus according to claim 5, wherein
   the second peripheral device is a personal computer (PC) card interface portion which supports DMA transfer having the first data width and DMA transfer having a second data width,
   the second peripheral device uses only the data bus to perform DMA transfer when a connected PC card supports the DMA transfer having the first data width, and the second peripheral device uses at least a part of the address bus as the data bus to perform DMA transfer when a connected PC card supports the DMA transfer having the second data width.

8. An entertainment apparatus according to claim 5, wherein the second peripheral device is a compact disc/digital versatile disc (CD/DVD) decoder.

9. An entertainment apparatus according to claim 5, wherein the controller is an input/output (I/O) processor.

10. An entertainment apparatus according to claim 6, wherein
the second peripheral device is a personal computer (PC) card interface portion which supports DMA transfer having the first data width and DMA transfer having the second data width, the second peripheral device uses only the data bus to perform DMA transfer when a connected PC card supports the DMA transfer having the first data width, and the second peripheral device uses at least a part of the address bus as the data bus to perform DMA transfer when a connected PC card supports the DMA transfer having the second data width.

* * * * *